United States Patent [19]

Matzner et al.

[11] Patent Number: 4,746,709

[45] Date of Patent: May 24, 1988

[54] COPOLYMERS OF POLYPHENYLENE OXIDES AND POLYARYLATES

[75] Inventors: Markus Matzner, Edison, N.J.; Donald M. Papuga, Danbury, Conn.

[73] Assignee: Amoco Corporation, Chicago, Ill.

[21] Appl. No.: 889,305

[22] Filed: Jul. 28, 1986

Related U.S. Application Data

[63] Continuation of Ser. No. 777,579, Sep. 19, 1985, abandoned, which is a continuation of Ser. No. 701,813, Feb. 19, 1985, abandoned, which is a continuation of Ser. No. 564,391, Dec. 22, 1983, abandoned.

[51] Int. Cl.[4] ........................ C08G 81/00; C08G 63/18

[52] U.S. Cl. .................................... 525/397; 525/437; 525/534

[58] Field of Search ........................ 525/397, 534, 437

[56] References Cited

U.S. PATENT DOCUMENTS

| | | | |
|---|---|---|---|
| 3,703,564 | 11/1972 | White | 525/397 |
| 3,819,759 | 6/1974 | Weaver | 525/397 |
| 4,259,458 | 3/1981 | Robeson | 525/397 |
| 4,286,075 | 8/1981 | Robeson | 525/397 |
| 4,386,174 | 5/1983 | Cogswell | 525/397 |

*Primary Examiner*—Patricia A. Short
*Attorney, Agent, or Firm*—Donald M. Papuga; William H. Magidson; Ralph C. Medhurst

[57] ABSTRACT

Described are novel copolymers of polyphenylene oxides and polyarylates. These copolymers are readily compatible with styrene polymers and copolymers and give tough binary, ternary and quaternary blends.

4 Claims, No Drawings

COPOLYMERS OF POLYPHENYLENE OXIDES AND POLYARYLATES

This application is a continuation of prior U.S. application Ser. No. 777,579 filed Sept. 19, 1985, which is a continuation of application Ser. No. 701,813 filed Feb. 19, 1985, which is a continuation of application Ser. No. 564,391 filed Dec. 22, 1983, now all abandoned.

BACKGROUND OF THE INVENTION

Described herein are novel copolymers of polyphenylene oxides and polyarylates. These copolymers are readily compatible with styrene polymers and/or copolymers and give tough blends.

Polyarylates are polyesters derived from one or more dihydric phenols, particularly 2,2-bis(4-hydroxyphenyl)propane, also identified as Bisphenol-A, and one or more aromatic dicarboxylic acids, particularly mixtures of terephthalic and isophthalic acids. These polyarylates are high temperature, high performance thermoplastic polymers with a good combination of thermal and mechanical properties. They also have good processability which allows them to be molded into a variety of articles.

Polyarylate polymers are compatible with a wide variety of other polymeric systems. However, polyarylate polymers have only marginal mechanical compatibility with styrenic polymers. This marginal compatibility is manifested in poor weld-line strength as well as poor surface appearance of articles molded from such blends.

Thus, there is a desire to make polyarylate polymers compatible with styrene polymers and/or copolymers.

THE INVENTION

It has now been found that by first forming a copolymer of a polyphenylene oxide and a polyarylate, the resulting copolymers are compatible with styrene polymers and/or copolymers. The blend may additionally contain a polyarylate and/or a polyphenylene oxide.

In one embodiment, the novel copolymers of this invention are prepared by a process which involves first forming a quinone-coupled polyphenylene oxide. The quinone-coupled polyphenylene oxide is prepared by well-known prior art methods such as those described in, for example, U.S. Pat. No. 4,140,675.

Broadly, the quinone-coupled polyphenylene oxides can be prepared by reacting polyphenylene oxides containing quinones under reaction conditions, e.g., time, temperature and pressure, which facilitate reaction of at least a portion, and preferably substantially all of any quinone species of polyphenylene oxides, subject to the proviso that the reaction is carried out in a reaction medium substantially free of (1) any monophenol reactant and (2) any active oxidative coupling catalyst system known to those skilled in the art which promotes self-condensation of monophenols to from polyphenylene oxides.

Accordingly, any prior art quinone containing polyphenylene oxide reaction product can be employed including those described in, for example, U.S. Pat. Nos. 3,306,879; 3,914,266; 3,972,851 and 3,965,069, subject to the proviso that the reaction products be separated from substantially all of the active catalyst system as well as substantially all of any unreacted phenol prior to reacting the quinone with the polyphenylene oxide. Separation of the active catalyst system from the prepared prior art polyphenylene oxides can be carried out by any means, e.g., by purging oxygen from the reaction medium via inert gas displacement by argon, nitrogen, etc., whereby substantially all of the oxygen or air employed in the oxidative coupling process is separated from the polymer; by centrifuging the reaction products whereby substantially all of any copper or manganese component of the active catalyst system and/or any unreacted monophenol contained within the aqueous phase reaction products is separated from the organic phase which comprises substantially all of the polyphenylene oxide and quinone plus minor amounts of any primary, secondary or tertiary amines employed in the prior art catalytic processes.

As stated hereinbefore, any reaction temperature can be employed for the coupling. Preferably, temperatures of from 0° to 100° C. are used.

Any prior art polyphenylene oxide can be employed, regardless of intrinsic viscosity or the amount of quinone contained within the polyphenylene oxide charged to the reaction medium which polyphenylene oxide is prepared according to any of the prior art methods. Illustrative of prior art, etc., polyphenylene oxides that can be employed are those of the formula:

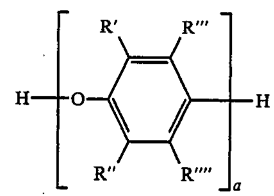

wherein a is at least equal to 1 and is preferably 40 to 1000, the R's are hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus. The substituents can be the same or different.

The product is a quinone-coupled polyphenylene oxide having an average hydroxyl group per molecule value greater than the average hydroxyl group value associated with the starting polyphenylene oxide reactant.

Broadly, the quinone-coupled polyphenylene oxides can be illustrated by the formula

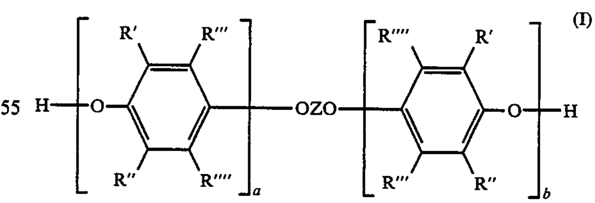

wherein independently each —OZO— is a divalent aromatic residue derived from a quinone, Z is a divalent arylene radical, a and b are at least equal to 1, the sum of a plus b is at least equal to 10, preferably to 40 to 1000, the R's are as heretofore defined. Preferred quinone-coupled polyphenylene oxide products are of formula (I) above wherein independently each R′, R″, R‴, and R⁗ is hydrogen, a hydrocarbon radical, a halohydrocarbon radical, and even more preferably where R′ and R″ are methyl radical, R‴ and R⁗ being hydrogen atoms.

In a second embodiment, mono-functional polyphenylene oxides of the following general formula (II) can be used:

(II)

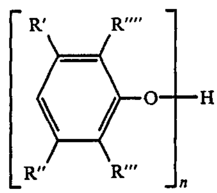

the R's are independently as defined above and n is integer of at least 10, preferably from 40 to 1000.

The polyarylates which are suitable for use in this invention are derived from a dihydric phenol and at least one aromatic dicarboxylic acid and have a reduced viscosity of from about 0.2 to greater than about 1.0, preferably from about 0.2 to about 0.8 dl/gm, as measured in chloroform (0.5 g/100 ml chloroform or other suitable solvent at 25° C.

A particularly desirable dihydric phenol is of the following formula:

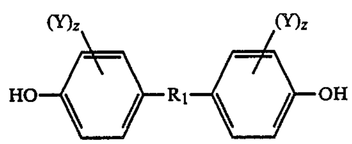

wherein Y is selected from hydrogen, alkyl groups of 1 to 4 carbon atoms, chlorine or bromine, each z, independently, has a value of from 0 to 4, inclusive, and $R_1$ is a divalent saturated or unsaturated alliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, S, or a chemical bond. The dihydric phenols may be used individually or in combination.

The dihydric phenols that may be used in this invention include the following:

2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)-propane,
4,4′-(dihydroxyphenyl)ether,
4,4′-(dihydroxyphenyl)sulfide,
4,4′-(dihydroxyphenyl)sulfone,
4,4′-(dihydroxyphenyl)sulfoxide,
4,4′-(dihydroxybenzophenone),
hydroquinone, 2,2′; 3,3′; or 4,4′-biphenol and the naphthalene diols.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Hydroxybenzoic acid and other aromatic hydroxy acids or their derivatives such as p-acetoxybenzoic acid can be used in addition to the dicarboxylic acids listed above. Preferably, mixtures of isophthalic acid and terephthalic acids are used. The isophthalic acid or terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates may be prepared by the diacetate process, the acid chloride process or the diphenate process.

In the diacetate process a diester derivative of a dihydric phenol is reacted with an aromatic dicarboxylic acid.

The preparation of the polyarylate by this process may be carried out in bulk preferably in the presence of from about 10 to about 60, more preferably from about 25 to about 60, and most preferably, from about 30 to about 60 weight percent, based on the weight of the polyarylate produced, of an organic, high boiling liquid serving the function of a processing acid.

The preferred organic processing aids are a diphenyl ether compound as described in U.S. Pat. No. 4,294,956 a cycloaliphatic substituted aromatic or heteroaromatic compound, as described in U.S. Pat. No. 4,294,957 and a halogenated and/or etherated substituted aromatic or heteroaromatic compound, as described in U.S. Pat. No. 4,374,239.

The diphenyl ether compound, as described in U.S. Pat. No. 4,294,956 may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interefere with the polyarylate forming reaction or the reaction forming the diester derivative of the dihydric phenol.

The cycloaliphatic compounds, or substituted aromatic or heteroaromatic compounds, as described in U.S. Pat. No. 4,294,957 contain at least one benzylic and/or tertiary hydrogen atoms. These compounds have a boiling point of about 150° to about 350° C., preferably from about 180° to about 280° C., and most preferably from about 180° to about 260° C., at atmospheric pressure. Additionally, these compounds have a solubility parameter, at a temperature of 250° C., of ±4 within the solubility parameter of the polyarylate being produced. Solubility parameter is a measure for correlating polymer solvent interaction. It is defined in "Properties of Polymers", D. W. Van Krevelen, Elsevier Scientific Publishing Co., Amsterdam-Oxford- New York, 1976, pp. 141–155, as the square root of the cohesive energy density.

The preferred compounds include xylenes, cumene, diethylbenzene, diisopropyl benzene, tetrahydronaphthalene; decahydronaphthalene; 1,2,3-trichlorobenzene; 1,2,4-trichlorobenzene; 1,2- or 1,3- or 1,4-dichlorobenzene; 1,2,3- or 1,2,4- or 1,3,5-trimethoxybenzene; 1,2- or 1,3- or 1,4-dibromobenzene; chlorobenzene; bromobenzene; 1-chloronaphthalene; 2-chloronaphthalene; 1-bromonaphthalene; 2-bromonaphthalene; 1,2- or 1,3- or 1,4-dimethoxybenzene; 2-bromotoluene; 2-chlorotoluene; 4-bromotoluene; 4-chlorotoluene; anisole; 2-methylanisole; 3-methylanisole; 4-methylanisole; 2-chloroanisole; 3-chloroanisole; 4-chloroanisole; 2-bromoanisole; 3-bromoanisole and 4-bromoanisole.

Additionally, the cycloaliphatic, substituted aromatic or heteroaromatic and the halogenated and/or etherated substituted aromatic or heteroaromatic compounds may be used with up to 90 weight percent of other compounds such as diphenyl ether, dimethylsulfone, etc.

A catalyst may be used to accelerate the rate of polyarylate formation. All the conventional catalysts capable of accelerating an ester exchange or acidolysis reaction are suitable for use herein. These include metal salts, generally the Group VII and VIII metal salts, such as magnesium, manganese or zinc salts. The salts are generally organic acid salts and include acetates, propionates, benzoates, oxalates, acetylacetonates, or mixtures thereof. A preferred catalyst is magnesium acetate. The catalyst is present in the reaction in a catalytically effective amount which can be, for example, from about 1 to about 1000, preferably from about 10 to about 50, parts per million, based on the weight of the polyarylate produced.

A preferred process for preparing polyarylates by the diacetate process is described in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million.

The polyarylate polymer may be prepared in two reaction vessels by this process by adding the acid anhydride and dihydride phenol to a reaction vessel and reacting these under esterification conditions described, supra to form the diester derivative of the dihydric phenol. Residual acid anhydride is then removed by methods known in the art, such as by vacuum distillation, or by chemical reaction with reactants which are not harmful to the polymerization, such as water, alcohols, dihydroxy compounds, and the like. The diester derivative may then be added to a second reaction zone, without any purification. The second reaction zone (vessel) contains aromatic dicarboxylic acid(s), and optionally the processing aid and/or catalyst. The polymerization is then carried out. Alternatively, the diester derivative is added to the second reaction zone and aromatic dicarboxylic acid(s), and optionally, the processing aid and/or catalyst added thereto and the polymerization carried out. Any combination of adding the diester derivative, aromatic dicarboxylic acid(s), and optionally the processing aid and/or catalyst to a reaction vessel may be used.

In another embodiment, the diester derivative of the dihydric phenol is prepared in a reaction zone by reacting the acid anhydride and dihydric phenol therein under the esterification conditions described, supra. Residual acid anhydride is then removed by the procedures described, supra. Aromatic dicarboxylic acid(s) and optionally the processing aid and/or catalyst is then added to the reaction zone and the polymerization reaction carried out to produce the polyarylate.

The dihydric phenol diester is prepared by reacting a dihydric phenol with an acid anhydride at a temperature of from about 130° to about 160° C. for a period of from about 0.5 to about 4 hours and at a pressure of from about 1 to about 3 atmospheres. Generally, the reaction is carried out using an excess of acid anhydride. The acid anhydride is used at about 25 percent excess. The process is preferably carried out at a pressure sufficient to have the solvent refluxing at the reaction temperature. Under these conditions conversion to the dihydric phenol diester is at least 99.9 percent.

The polyarylate polymerization process is carried out at a temperature of from about 260° to about 350° C. and preferably, from about 260° to about 295° C. The polymerization process is generally conducted in an inert atmosphere (such as argon or nitrogen) so that the oxygen content therein is minimized or eliminated. The oxygen content is generally less than about 100, preferably less than about 30, and most preferably less than about 10 parts per million. The process is preferably carried out at a pressure sufficient to have the solvent refluxing at the reaction temperature. This pressure is generally from about atmospheric to about 11 atmospheres. Lower and higher pressures may also be used.

The polymerization reaction is conducted for a period of time sufficient to produce a polyarylate having a reduced viscosity of at least about 0.2 to greater than 1.0 dl/gm, which time is generally less than about 10 hours. The reaction time is generally in the range of from about 4 hours to about 8 hours, depending on the particular polyarylate being prepared.

The polymerization reaction may be carried out batchwise or continuously and by using any apparatus desired.

The polyarylates can also be prepared by the acid chloride process whereby the acid chlorides of the acids are reacted with diphenols, and the diphenate process whereby the diaryl esters of the aromatic diacids are reacted with the diphenols.

Two procedures can be used for the preparation of the polyarylates via the acid chloride route. One is carried out at low temperature and the other at high temperature. In the low temperature technique polycondensation of the acid chlorides derived from terephthalic and isophthalic acids with the dihydric phenols is effected at ambient temperatures in an inert solvent, such as methylene chloride, in the presence of a basic catalyst and an acid acceptor. A second immiscible solvent, e.g., water, may be present. In the high temperature technique, polycondensation of acid chlorides with the dihydric phenols is effected in a high boiling solvent, such as 1,2,4-trichlorobenzene, at temperatures above about 150° C., and preferably, at about 200° to about 220° C.

Other suitable inert organic solvents useful for low temperature polycondensation include halogenated aliphatic compounds, such as, chloroform, methylene bromide, 1,1,2-trichloroethane as well as methylene chloride mentioned above and the like; and cyclic ethers such as tetrahydrofuran, dioxane, and the like. For the high temperature polycondensation, suitable solvents include halogenated aromatic compounds such as, o-dichlorobenzene, 1,2,4-trichlorobenzene, diphenyl ether, diphenyl sulfone, benzoic acid alkyl esters wherein the alkyl group contains 1 to about 12 carbon atoms, phenolic ethers, such as, anisole and the like.

Preferred acid acceptors for use in the low temperature polycondensation are alkali metal and alkaline earth metal hydroxides including sodium, potassium, barium, calcium, strontium, magnesium, and beryllium hydroxides.

Useful basic catalysts for use in the low temperature polycondensation include tertiary amines such as alkyl amines, including trimethylamine, triethylamine, tripropylamine, tributylamine, and the like; where the alkyl group contains from 1 to about 10 carbon atoms; alkaryl amines such as, N,N-dimethylaniline, N,N-diethylaniline, N,N-dimethylnaphthylamine, benzyl dimethylamine, alpha-methylbenzyl dimethylamine, pyridine, cyclic diazo compounds, such as diazobicyclooctane (DABCO), diazo bicyclononene (DBN) and a diazobicycloundecene (DBU) and the like.

Polymerizations using the diphenate process can be carried out in the melt at between 285° C. and 350° C. The preferred temperature range is about 300° C. to 340° C. In general reduced pressure for the final portions of the reaction is used. They can also be carried out either as a solution reaction or suspension reaction under those conditions using appropriate processing aids. The processing aid(s) or suspending agent(s) are the same as those described above for the diacetate process. Typical catalyst include tin compounds and generally those mentioned above for the diacetate process. Particularly preferred catalysts are Ti and tin salts, Mg acetate, and alkali metal salts, alkoxides and phenoxides.

If desired a chain stopper can be used to control the molecular weight of the polyarylates obtained. Suitable agents include monohydric phenols or their derivatives, such as, p-phenylphenol, and the like and monofunctional carboxylic acid or their derivatives, such as the aryl ester of benzoic or naphthoic acids, and the like.

The polyarylates of this invention have a reduced viscosity of from about 0.2 to greater than about 1.0, preferably from about 0.2 to about 0.8 dl/gm, as measured in chloroform (0.5 g/dl chloroform) or other suitable solvent at 25° C.

The styrenic polymers, (i.e., copolymers, terpolymers, etc.) suitable for use herein include styrene/acrylonitrile copolymers, especially ABS type polymers, the molecules of which contain two or more polymeric parts of different compositions that are bonded chemically. The ABS type polymers are preferably prepared by polymerizing a conjugated diene, such as butadiene or another conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

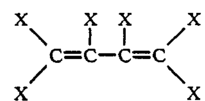

wherein X may be hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3,-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are the styrenes, such as: styrene, 3-methylstyrene; 3,5-diethylstyrene, 4-n-propylstyrene, $\alpha$-bromostyrene, dichlorostyrene, dibromostyrene, tetrachlorostyrene, mixtures thereof, and the like. The preferred monovinylaromatic hydrocarbons used are styrene, $\alpha$-methylstyrene and/or p-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 60% by weight or less of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. In this case, the styrenes may comprise from about 30 to about 80% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where $\alpha$-methylstyrene (or other monomer) is substituted for the styrene in the composition used in preparing the graft polymer, a certain percentage of the composition may be an $\alpha$-methylstyrene/acrylonitrile copolymer. Also, there are occasions where a copolymer, such as $\alpha$-methylstyrene/acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like, or it may also be an ethylene-propylenediene backbone. Additionally, minor amounts of a diene may be copolymerized in the acrylate rubber backbone to yield improved grafting with the matrix polymer.

These resins are well known in the art and many are commercially available.

The process of preparing the copolymers of polyphenylene oxides and polyarylate can be of two types:

(1) The monofunctional or difunctional hydroxyl terminated polyphenylene oxide is correacted in a typical polyarylate forming reaction. Thus, as described above, the polyarylate are prepared by one of several methods of which the diacetate process is representative. The reaction shown is a typical example:

$nCH_3COO—ArOCOCH_3$ +

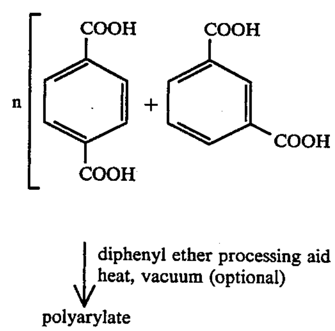

diphenyl ether processing aid heat, vacuum (optional)

polyarylate where —Ar— is, for example, the residue of bisphenol-A. If in the above equation part of the diacetate of bisphenol-A is replaced by the acetate (or diacetate) ester of the polyphenylene oxide (I) or (II), a copolymer will be obtained. $n_1CH_3COOArOCOCH_3+n_2$diacetate of (1)

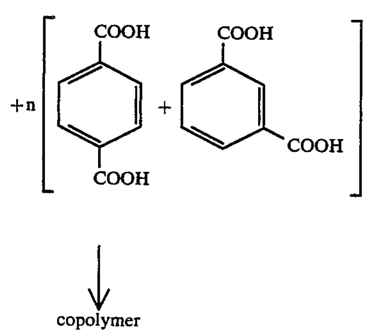

copolymer where $n_1 + n_2 = n$

Reaction (I)

Similarly,

-continued nHOArOH + n

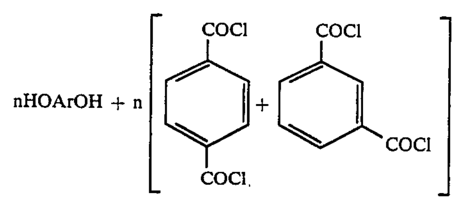

as the dialkali metal salt $H_2O$/methylene chloride $NaOH/(C_2H_5)_3N$ catalyst Copolymer Replacement of part of the bisphenol with polyphenylene oxide (II) leads to the copolymer as shown in Reaction (II):

$n_3HOArOH + n_4(II) + n$

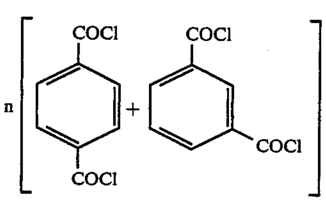

as the dialkali metal salts $H_2O$/organic solvent (e.g. chlorobenzene $NaOH/(C_2H_5)_3N$ catalyst.

Copolymer (Reaction (II))

Obviously, the number of reactive acid chloride groups will have to match the number of hydroxyl groups to maximize the polymerization reaction.

For Reaction I copolymers of the structure $(AB)_x$ are obtained wherein A is the polyphenylene oxide residue and B is the polyarylate residue. Reaction II yields copolymers AB and ABA wherein A and B are as defined above.

(2) A polyarylate oligomer is prepared with a well defined termination. Depending on the particular case the latter can be a hydroxyl, an acid halide, or phenyl carboxylate, an acetate, etc. end group. Molecular weight control and termination of the oligomer are easily controlled by using a calculated excess of one of the reactants, as illustrated in reaction (III).

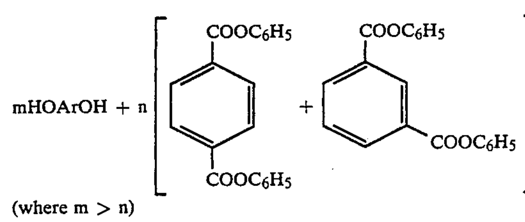

(where m > n)

Diphenyl ether processing aid, heat vacuum.

Oligomer (III) with hydroxyl termination (Reaction III)

Oligomer (III) or similar other oligomers can then be coupled with the polyphenylene oxides (1) or (II) via any of the methods known in the art. For example:

Oligomer (III) + Polyphenylene oxide (I) or (II) + diphenyl isophthalate

↓

Copolymer

Oligomer (III) + Polyphenylene oxide (I) or (II) + $COCl_2$

↓

Copolymer

Acid chlorides, diisocyanates, and other coupling means known to those skilled in the art are useful.

For the copolymers ABA and/or $(AB)_n$, the weight ratio of A to B can vary from 5:95 to 95:5. The preferred copolymer contains from 30 to 70 weight percent of A and from 70 to 30 weight percent of B. The preferred molecular weights of the block A are as described above and those of block B are generally in the same range.

The blends are compatible and possess excellent toughness. The blends may contain from 5 to about 95 weight percent of each of the components. The preferred compositions contain from about 30 to about 70 weight percent of the styrene polymer and/or copolymer, and optionally, from about 30 to about 70 weight percent of a poly(aryl ether) and/or a polyphenylene oxide.

EXAMPLES

The following examples serve to give specific illustrations of the practice of this invention but they are not intended in any way to limit the scope of this invention.

EXAMPLE 1

Preparation of Poly(phenylene oxide) Oligomers

Using techniques described in the literature, as for example, in U.S. Pat. No. 4,355,661, Examples 1 and 2, the following mono- and difunctional poly(phenylene oxide) oligomers are prepared:

A monofunctional oligomer having a number average molecular weight of 5500.

A difunctional oligomer having a number average molecular weight of 8000.

EXAMPLE 2

In a 0.5 liter flask equipped wiht a stirrer, thermometer, a distillation set-up and an argon inlet tube are placed 15.617 gms (0.05 mole) of the diacetate of bisphenol-A, 0.05 moles of the acetate of the monofunctional polyphenylene oxide prepared in Example 1, possessing a molecular weight of about 5,500 and having the structure:

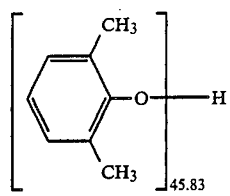

and 6.04 (0.037 moles) of each terephthalic and isophthalic acids. To this mixture are added about 100 ml of diphenyl ether. Heating, stirring and argon circulation are started. When the temperature reaches about 250° C. strong distillation of acetic acid is observed. The reaction mixture is gradually heated to 290° C. with continuous distillation of acetic acid and diphenyl ether. After 5 hrs a very viscous melt is obtained (290° C.). The melt is cooled and finely ground. A quantitative yield of a slightly yellow copolymer of polyphenylene oxide and the poly(iso/terephthalate) (1:1) of bisphenol-A results.

EXAMPLE 3

Using the procedure of Example 2 above a copolymer containing the difunctional polyphenylene oxide at a ratio of A to B of 40:60 is prepared.

EXAMPLES 4 TO 10

A series of blends containing the copolymers of Examples 2 and 3 is prepared using impact polystyrene and an ABS polymer. In all instances tough blends are obtained. As shown in Table I. For comparison blends 4 and 9 are made using a polyarylate of the following formula:

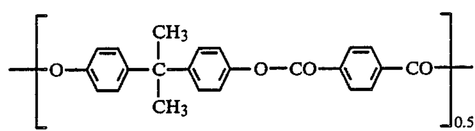

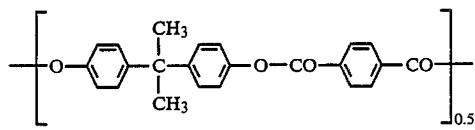

TABLE I

BINARY BLENDS

| Example | Composition (wt. %) | | Properties |
|---|---|---|---|
| 4 | Polyarylate-Polystyrene | (50:50) | Brittle |
| 5 | Copolymer of Ex. 2-Polystyrene | (30:70) | Ductile |
| 6 | Copolymer of Ex. 2-Polystyrene | (40:60) | Very Tough |
| 7 | Copolymer of Ex. 2-Polystyrene | (50:50) | Very Tough |
| 8 | Copolymer of Ex. 2-Polystyrene | (60:40) | Ductile |
| 9 | Polyarylate - ABS | (50:50) | Brittle |
| 10 | Copolymer of Ex. 3 - ABS | (30:70) | Ductile |
| 11 | Copolymer of Ex. 3 - ABS | (40:60) | Very Tough |
| 12 | Copolymer of Ex. 3 - ABS | (50:50) | Very Tough |
| 13 | Copolymer of Ex. 3 - ABS | (60:40) | Very Tough |

TABLE I-continued

| BINARY BLENDS | | | |
|---|---|---|---|
| Example | Composition (wt. %) | | Properties |
| 14 | Copolymer of Ex. 3 - ABS | (70:30) | Very Tough |

Ternary and quaternary blends were prepared and the results are summarized in Table II.

TABLE II

| Ternary Blends and Quaternary Blends | | | |
|---|---|---|---|
| Example | Composition (wt. %) | | Properties |
| 15 | Copolymer of Ex. 2 - Polyarylate(1)-Polystyrene | (30:35:35) | Tough |
| 16 | Copolymer of Ex. 2 - Polyarylate(1)-Polystyrene | (40:30:30) | Tough |
| 17 | Copolymer of Ex. 2 - Polyarylate(2)-Polyphenylene oxide- Polystyrene | (40:15:15:30) | Very tough |
| 18 | Copolymer of Ex. 3 - polyphenylene oxide - ABS | (30:35:35) | Very tough |
| 19 | Copolymer of Ex. 3 - polyarylate(2) -ABS | (30:30:40) | Tough |
| 20 | Copolymer of Ex. 3 - polyarylate(1)-ABS | (40:30:30) | Tough |
| 21 | Copolymer of Ex. 3 - polyarylate(1)-polyphenylene oxide-ABS | (30:15:25:35) | Very Tough |

(1)Polyarylate based on bisphenol-A and a 1:1 molar ratio of terephthalic and isophthalic acids.
(2)Polyarylate based on bisphenol-A and a 6:4 molar ratio of terephthalic and isophthalic acids.

What is claimed is:

1. A copolymer comprising:

I. from 30 to 70 weight percent of a polyphenylene oxide selected from the following formulae:

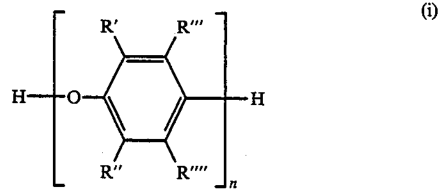

wherein n is at least equal to 10, the R's are independently hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, and

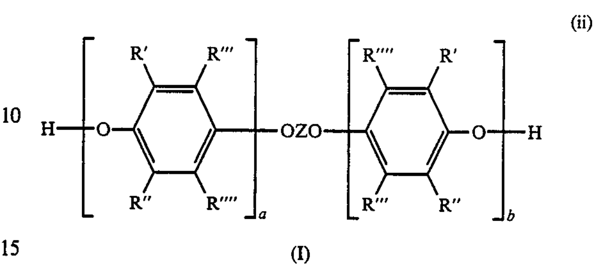

wherein independently each —OZO— is a divalent aromatic residue derived from a quinone, Z is a divalent arylene radical, a and b are at least equal to 1, the sum of a plus b is at least equal to 10, the R's are as heretofore defined, and combinations of (i) and (ii) and;

II. from 70 to 30 weight percent of a polyarylate derived from a dihydric phenol and at least one aromatic dicarboxylic acid and having a reduced viscosity of from 0.2 to greater than about 1.0 dl/gm, as measured in chloroform (0.5 g/dl chloroform) at 25° C.

2. A copolymer, as defined in claim 1, wherein the polyphenylene oxide has repeating units of the formula:

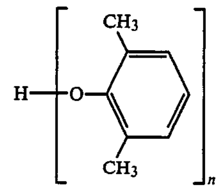

3. A copolymer, as defined in claim 1, wherein the polyarylate is derived from bisphenol A and terephthalic or isophthalic acids, or mixtures thereof.

4. A copolymer, as defined in claim 1, wherein the polyarylate is derived from tetramethyl bisphenol A and terephthalic or isophthalic acids, or mixtures thereof.

* * * * *